United States Patent
Zhang et al.

(10) Patent No.: US 12,234,167 B1
(45) Date of Patent: Feb. 25, 2025

(54) MECHANO-CHEMICAL WASTEWATER TREATMENT EQUIPMENT

(71) Applicant: TONGJI UNIVERSITY, Shanghai (CN)

(72) Inventors: Weixian Zhang, Shanghai (CN); Yuxiang Shi, Shanghai (CN); Shaolin Li, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 0 days.

(21) Appl. No.: 18/776,196

(22) Filed: Jul. 17, 2024

(30) Foreign Application Priority Data

Dec. 19, 2023 (CN) .......................... 202311743822.4

(51) Int. Cl.
| | |
|---|---|
| *C02F 1/70* | (2023.01) |
| *B01J 20/02* | (2006.01) |
| *C02F 1/62* | (2023.01) |
| *B01J 8/20* | (2006.01) |
| *B01J 20/28* | (2006.01) |
| *C02F 1/00* | (2023.01) |
| *C02F 101/20* | (2006.01) |

(52) U.S. Cl.
CPC .......... *C02F 1/705* (2013.01); *B01J 20/0229* (2013.01); *C02F 1/62* (2013.01); *B01J 8/20* (2013.01); *B01J 20/28004* (2013.01); *C02F 2001/007* (2013.01); *C02F 2101/20* (2013.01); *C02F 2305/08* (2013.01)

(58) Field of Classification Search
None
See application file for complete search history.

(56) References Cited

U.S. PATENT DOCUMENTS

| | | | | |
|---|---|---|---|---|
| 5,043,080 A | * | 8/1991 | Cater ...................... | C02F 1/32 |
| | | | | 210/759 |
| 2017/0240448 A1* | | 8/2017 | Lembcke .............. | C02F 1/5281 |
| 2021/0078881 A1* | | 3/2021 | Lloyd .................... | C02F 1/705 |

FOREIGN PATENT DOCUMENTS

| | | |
|---|---|---|
| CN | 101062780 A | 10/2007 |
| CN | 103043844 A | 4/2013 |
| CN | 110282717 A | 9/2019 |
| CN | 113262849 A | 8/2021 |
| CN | 114409051 A | 4/2022 |
| CN | 116161834 A | 5/2023 |

(Continued)

*Primary Examiner* — Clare M Perrin
(74) *Attorney, Agent, or Firm* — H&I PARTNERS; Chai Im; C. Andrew Im

(57) ABSTRACT

Mechano-chemical wastewater treatment equipment to treat wastewater containing heavy metals to form drainage. An intermediate sewage tank has a sewage inlet and a sewage outlet, and stores wastewater to be treated and sewage formed during the treatment process. At least one mechano-chemical reactor conducts the mechano-chemical reaction between the wastewater and zero-valent iron nanoparticles through a ball milling treatment. A separator to separate a slurry produced by the reactor into solids and liquids. The separator has a slurry inlet, a liquid outlet, and a sludge outlet. The reactor is a ball milling device having a reactor shell with a reaction chamber internally formed, a feeding inlet for the slurry to enter the reaction chamber and a discharge outlet for the slurry to flow out of the reaction chamber. A rotor is set inside the reaction chamber and a driving mechanism rotates the rotor.

9 Claims, 3 Drawing Sheets

(56) References Cited

FOREIGN PATENT DOCUMENTS

| | | | | |
|---|---|---|---|---|
| KR | 2015-0124255 A | 11/2015 | | |
| KR | 101607823 B1 | 3/2016 | | |
| KR | 101616276 B1 | 4/2016 | | |
| KR | 101616825 B1 | 4/2016 | | |
| WO | WO-2018083594 A1 * | 5/2018 | .............. | C02F 1/465 |

* cited by examiner

MECHANO-CHEMICAL WASTEWATER TREATMENT EQUIPMENT

RELATED APPLICATIONS

This application claims priority from Chinese Patent Application No. 202311743822.4 filed Dec. 19, 2023, now Chinese Patent 117417052B, issued May 3, 2024, which is incorporated herein by reference in its entirety.

FIELD OF THE INVENTION

The present invention belongs to the environmental protection technology the field and relates to wastewater treatment equipment, specifically a mechano-chemical wastewater treatment equipment.

BACKGROUND OF THE INVENTION

The wastewater generated in the production processes of various industries, such as metallurgy, mechanical manufacturing, chemical engineering, and electronics, mostly contains heavy metal ions, such as lead, chromium, copper, zinc, nickel, etc. For treatment of such wastewater containing heavy metals, industrial methods such as evaporation, ion exchange, and permeation are commonly used to concentrate and separate heavy metals, or reduction reactions are used to convert heavy metals from soluble ion forms to insoluble precipitate forms for removal.

In the treatment methods for heavy metal ions in wastewater, zero valent iron can perform the function of adsorption, reduction, and precipitation/co-precipitation, making it a relatively ideal treatment material. The traditional reactor for zero valent iron and wastewater is usually a stirred tank reactor or a fluidized bed reactor. For example, CN103043844A discloses a method and device for removing heavy metals from industrial wastewater using electromagnetic stirring paddles, wherein the method involves rapid stirring and thorough mixing of industrial wastewater and zero-valent iron nanoparticles by electromagnetic stirring paddles, allowing the two to undergo contact reaction, thereby removing various heavy metals such as zinc, copper, and nickel from industrial wastewater.

Due to the difficulty of stirring to fully mix and contact zero valent iron with heavy metal ions, other forms of reactors have also emerged in prior art. For example, CN116161834A discloses a heavy metal wastewater treatment method based on a zero valent iron packed bed system, which sends pre-treatment wastewater into a zero valent iron packed bed system for treatment, wherein the system includes a zero valent iron packed bed reactor, which is provided with a packing layer, and the packing layer is filled with micrometer sized zero valent iron.

Although the above-mentioned packed bed reactor can provide sufficient contact between zero valent iron and heavy metal wastewater, it cannot affect the iron powder particles of zero valent iron. Due to the fact that the surface of zero-valent iron nanoparticles is usually coated with an oxide shell layer, which affects the electron transfer efficiency during the reaction process, and the reduced heavy metals will accumulate on the surface of the particles and shield the reaction sites, all of which affect the reaction efficiency between zero valent iron and heavy metals.

SUMMARY OF THE INVENTION

Based on the above issues; in order to improve the reaction efficiency between zero valent iron and heavy metals in wastewater, the present invention proposes a wastewater treatment equipment that uses ball milling equipment to form a mechano-chemical reactor.

The present invention provides a mechano-chemical wastewater treatment equipment for treating wastewater containing heavy metals to form drainage, characterized in that comprising: an intermediate sewage tank, utilized for storing the wastewater to be treated and sewage formed during the treatment process, provided with a sewage inlet and a sewage outlet; at least one mechano-chemical reactor, utilized for conducting the mechano-chemical reaction between the wastewater and zero-valent iron nanoparticles through a ball milling treatment; a separator, utilized for solid-liquid separation of a slurry produced by the mechano-chemical reactor, provided with a slurry inlet for the slurry to enter, a liquid outlet for the liquid separated to flow out, and a sludge outlet for the sludge separated to flow out; wherein, the mechano-chemical reactor is a ball milling device, comprising: a reactor shell with a reaction chamber internally formed, and provided with a feeding inlet for allowing the slurry to enter the reaction chamber and a discharge outlet for allowing the slurry to flow out of the reaction chamber; a rotor, which is set inside the reaction chamber; a driving mechanism, utilized for driving the rotation of the rotor, the sewage outlet is connected to the feeding inlet, the liquid outlet is connected to the sewage inlet, the slurry outlet is connected to the feeding inlet, and the slurry inlet is connected to the discharge outlet.

The mechano-chemical wastewater treatment equipment provided by the present invention can also comprise: a feeding hopper, utilized for feeding zero-valent iron nanoparticles and ball milling beads, and the feeding hopper is connected to the feeding inlet.

The mechano-chemical wastewater treatment equipment provided by the present invention can also include the technical feature that: wherein, a cooling water chamber is set at the periphery of the reaction chamber, which is formed around the reaction chamber without being connected to the reaction chamber and is utilized for accommodating cooling water for cooling the reaction chamber.

The mechano-chemical wastewater treatment equipment provided by the present invention can also include the technical feature: wherein, multiple inclined plates are set at the internal bottom of the separator.

The mechano-chemical wastewater treatment equipment provided by the present invention can also include the technical feature: wherein, the surface of the rotor is covered with a layer of polyurethane material.

The mechano-chemical wastewater treatment equipment provided by the present invention can also include the technical feature that: wherein, the overall position of the mechano-chemical reactor is lower than the sludge outlet.

The mechano-chemical wastewater treatment equipment provided by the present invention can also include the technical feature that: wherein, the overall position of the intermediate sewage tank is lower than the liquid outlet.

The mechano-chemical wastewater treatment equipment provided by the present invention can also include the technical feature that: wherein, the sewage outlet is connected to the feeding inlet through a sewage pipeline, and a feed pump is set on the sewage pipeline for pumping the sewage from the sewage outlet to the feeding inlet, the slurry inlet is connected to the discharge outlet through a slurry pipeline, and a discharge pump is set on the slurry pipeline for pumping the slurry from the discharge outlet to the slurry inlet.

The mechano-chemical wastewater treatment equipment provided by the present invention can also include the technical feature that: wherein, the number of the mechano-chemical reactors is multiple, the feeding inlets of the mechano-chemical reactors are parallelly connected, and the discharge outlets of the mechano-chemical reactors are parallelly connected.

The Effect of the Present Invention:

According to the mechano-chemical wastewater treatment equipment provided by the present invention, since a mechano-chemical reactor, which is equivalent to a ball milling equipment that can perform high-energy ball milling treatment on the slurry formed by wastewater and zero-valent iron nanoparticles, is used in the treatment, on the one hand, it ensures sufficient mixing and close contact of reactants and increases the contact area between reaction particles, promotes the diffusion of the entire interface, and significantly accelerates the reaction; on the other hand, ball milling can activate zero valent iron, significantly improving the reaction activity of zero valent iron and achieving high-energy degradation of pollutants. Therefore, the wastewater treatment equipment of the present invention can significantly improve the treatment effect, accelerate the treatment speed, and improve the final removal rate of heavy metals in wastewater.

Drawing reference signs: 100—mechano-chemical wastewater treatment equipment; 1—separator; 1A—slurry inlet; 1B—liquid outlet; 1C—sludge outlet; 2—slurry pipeline; 3—sludge return pipeline; 4—feeding pipeline; 5—feeding hopper; 6—sewage pipeline; 7—intermediate sewage tank; 7A—sewage inlet; 7B—sewage outlet; 8—feeding pump; 9—mechano-chemical reactor; 91—reactor shell; 91A—feeding inlet; 91B—discharge outlet; 911—reaction chamber; 912—cooling water chamber; 912A—cooling water inlet; 912B—cooling water outlet; 92—rotor; 93—end cover; 931—mechanical seal components; 94—driving mechanism; 95—main shaft; 96—bearing seat; 961—bearing; 97—belt wheel; 98—middle end cover; 10—discharge pump; 11—reflux valve; 12—reflux pipeline.

DETAILED DESCRIPTION OF THE INVENTION

Embodiment

Figure 1:
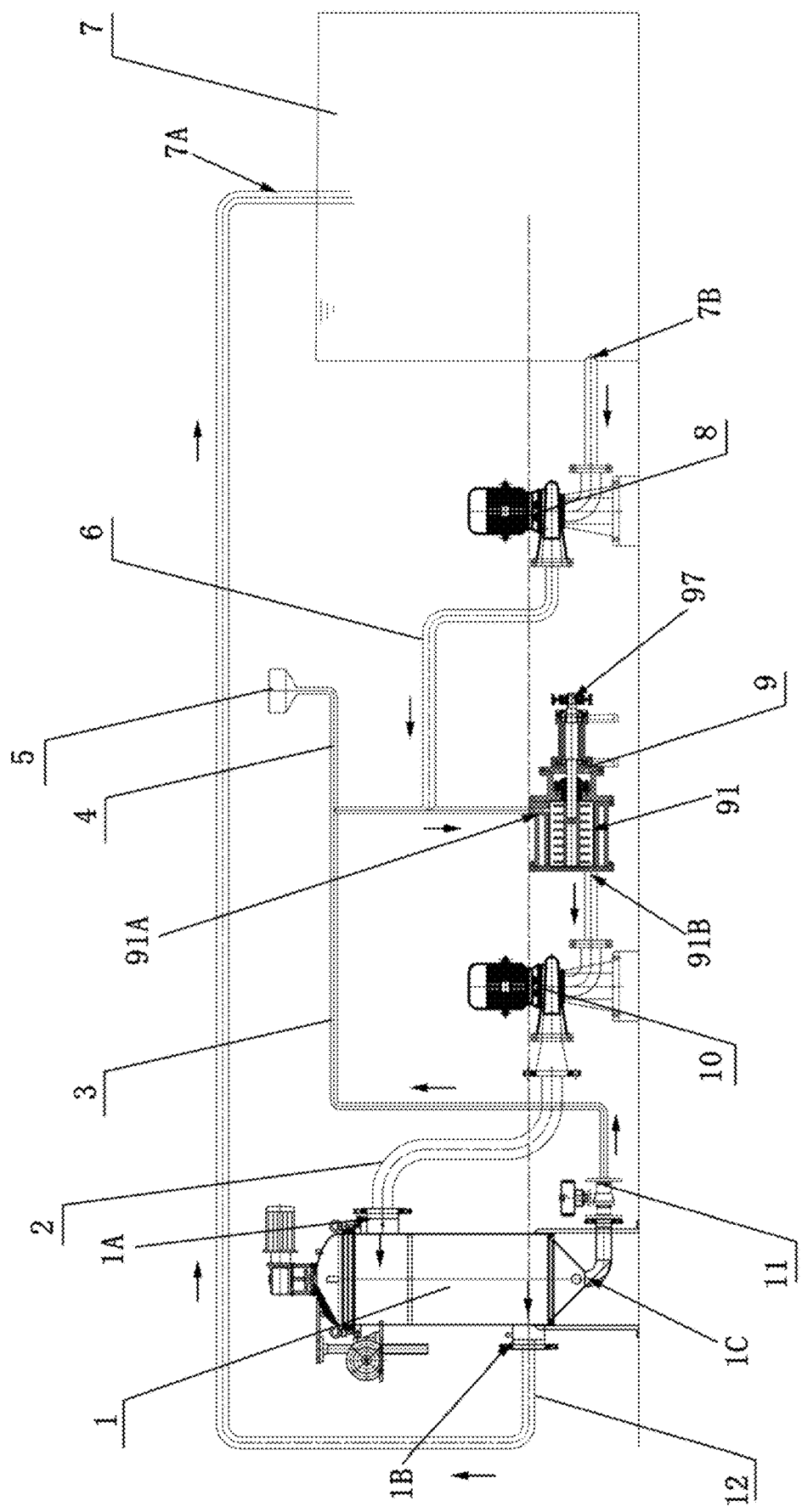
FIG. 1 is a schematic diagram of the structure of a mechano-chemical wastewater treatment equipment according to an embodiment of the present invention.

FIG. 1 is a schematic diagram of the structure of a mechano-chemical wastewater treatment equipment according to an embodiment of the present invention.

As shown in FIG. 1, a mechano-chemical wastewater treatment equipment (hereinafter referred to as wastewater treatment equipment) 100 of the present embodiment comprises a separator 1, a slurry pipeline 2, a sludge return pipeline 3, a feeding pipeline 4, a feeding hopper 5, a sewage pipeline 6, an intermediate sewage tank 7, a feeding pump 8, a mechano-chemical reactor 9, a discharge pump 10, a reflux valve 11, and a reflux pipeline 12.

The intermediate sewage tank 7 is used for storing the wastewater to be treated and sewage formed during the treatment process. It has a sewage inlet 7A and a sewage outlet 7B.

Mechano-chemical reactor 9 is used for the mechano-chemical reaction between wastewater and zero-valent iron nanoparticles.

Figure 2:
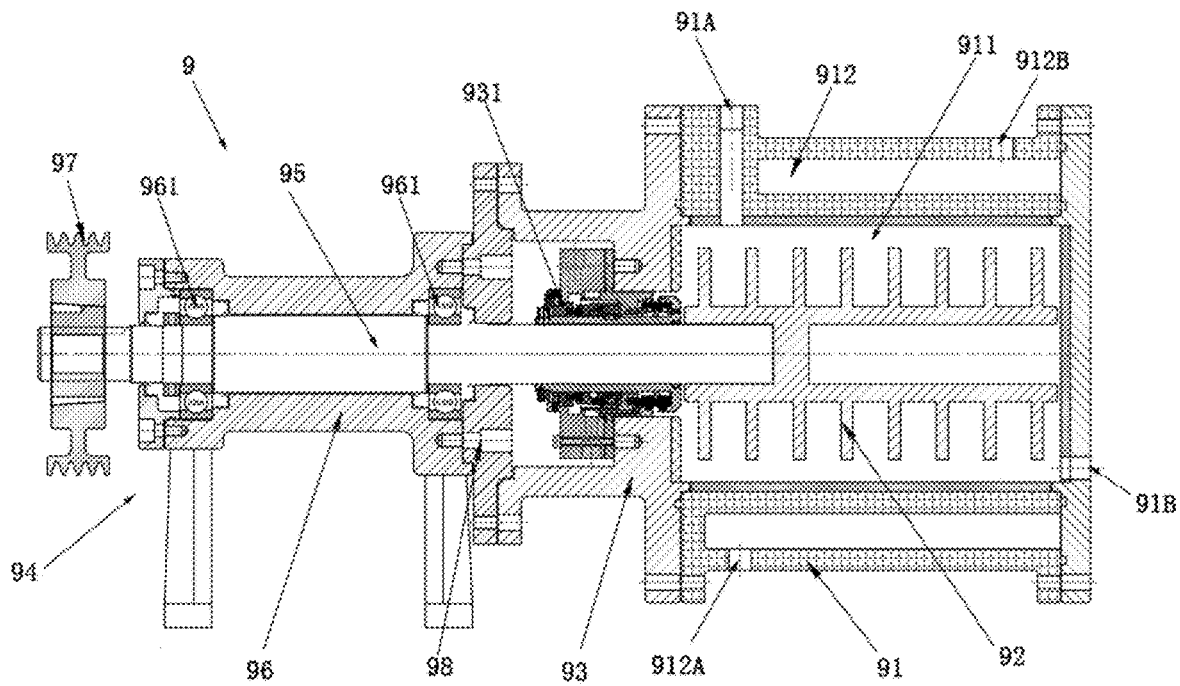
FIG. 2 is a structural diagram of a mechano-chemical reactor according to an embodiment of the present invention.

FIG. 2 is a structural diagram of a mechano-chemical reactor according to an embodiment of the present invention.

As shown in FIG. 2, the mechano-chemical reactor 9 is a ball milling device used for the mechano-chemical reaction between wastewater and zero-valent iron nanoparticles through ball milling treatment, comprising a reactor shell 91, a rotor 92, an end cover 93, and a driving mechanism 94. Wherein, the driving mechanism 94 is used to drive the rotor 92 to rotate, including a main shaft 95, a bearing seat 96, and a belt wheel 97.

The reactor shell 91 is roughly cylindrical shaped, with an internal cavity formed, which is a reaction chamber 911. A feeding inlet 91A and a discharge outlet 91B connected to the reaction chamber 911 are set on the reactor shell 91, which are respectively used to allow the slurry to enter and exit the reaction chamber 911.

In the reactor shell 91, a cooling water chamber 912 is set at the periphery of the reaction chamber 911, which is formed around the reaction chamber 911 and not connected to the reaction chamber 911 and is utilized for accommodating the cooling water for cooling the reaction chamber 911. Cooling water can enter the cooling water chamber 912 through the cooling water inlet 912A and flow out of the cooling water chamber 912 through the cooling water outlet 912B.

The rotor 92 is located inside reaction chamber 911, which is cylindrical and has multiple annular sheets on the circumferential surface. In the present embodiment, the surface of rotor 92 is covered with a layer of polyurethane material to reduce the wear of ball milling beads and other materials on the main body of rotor 92.

The end cover 93 is located at one end of reactor shell 91, and a middle end cover 98 is installed on the end of the end cover 93 away from reactor shell 91.

The bearing seat 96 is located on the opposite side of the middle end cover 98 relative to the end cover 93.

The main shaft 95 is installed in the bearing seat 96 through a bearing 961, and one end of the main shaft 95 passes through the middle end cover 98 and end cover 93 in sequence before extending into the reaction chamber 911. This end is connected to rotor 92, allowing the main shaft 95 to drive the rotor 92 to rotate.

A mechanical seal component 931 is set inside the end cover 93, which is set on the main shaft 95 and located near the reaction chamber 911 to form a seal on the main shaft 95 and prevent liquid leakage from the reaction chamber 911 to the bearing seat 96 or other parts.

The other end of the main shaft 95 extends outside the bearing seat 96, and the belt wheel 97 is set on this end. The driving motor (not shown in the figure) drives the belt wheel 97 to rotate through the belt transmission mechanism, causing the main shaft 95 to rotate and driving the rotor 92 to rotate in the reaction chamber 911. When there is slurry containing ball milling beads in the reaction chamber 911, the high-speed rotation of rotor 92 can vigorously stir the slurry, allowing it to undergo mechano-chemical reaction under the action of ball milling beads. This process will generate a large amount of heat, which can be carried away by cooling water.

The sewage pipeline 6 is used to connect the sewage outlet 7B and the feeding inlet 91A, allowing the sewage from intermediate sewage tank 7 to enter the reaction chamber 911.

The feeding pump 8 is installed on the sewage pipeline 6 to pump the sewage from the intermediate sewage tank 7 from sewage outlet 7B to feed inlet 91A.

The feeding hopper 5 is used for feeding, including the feeding of zero-valent iron nanoparticles and ball milling beads.

The feeding pipeline 4 is used to connect the feeding hopper 5 and the feeding inlet 91A, thereby guiding the materials fed from the feeding hopper 5 into the reaction chamber 911. The feeding pipeline 4 is provided with a feeding valve (not shown in the figure), which is used to seal the feeding pipeline 4 when not feeding, preventing the slurry from flowing back outward through the feeding hopper 5.

Separator 1 is used for solid-liquid separation treatment of slurry treated by the mechano-chemical reactor 9. The interior of separator 1 is a cavity structure, with a slurry inlet 1A at the upper end, a liquid outlet 1B on the lower side wall, and a sludge outlet 1C at the bottom. The separator 1 is provided with multiple inclined plates (not shown in the figure) set at the internal bottom. The slurry enters from the slurry inlet 1A and reaches the inclined plate, and the zero-valent iron nanoparticles in the slurry and the solid precipitate formed by the reaction of zero-valent iron nanoparticles and heavy metal ions in the sewage can deposit on the inclined plate and gradually slide down to the sludge outlet 1C through the inclined plate. As a result, the liquid in the slurry is separated and can flow out through liquid outlet 1B.

The slurry pipeline 2 is used to connect the slurry inlet 1A and the discharge outlet 91B, allowing the slurry treated by mechano-chemical reactor 9 to enter separator 1.

Discharge pump 10 is set on the slurry pipeline 2, used to pump the slurry from the discharge outlet 91B to the slurry inlet 1A.

The sludge return pipeline 3 is used to connect the sludge outlet 1C and the feeding inlet 91A, allowing the slurry to flow from the sludge outlet 1C to the feeding inlet 91A. The reflux valve 11 is set on the sludge return pipeline 3 to connect or shut off the sludge return pipeline 3.

In FIG. 1, the relative height position relationship of each part does not represent the actual height position relationship. In the present embodiment, the overall actual position of the mechano-chemical reactor 9 is lower than that of the sludge outlet 1C, so the sludge can naturally flow from the sludge outlet 1C to the feeding inlet 91A through gravity and enter the reaction chamber 911.

The reflux pipeline 12 is used to connect the liquid outlet 1B and the sewage inlet 7A, allowing the liquid from the liquid outlet 1B to flow to the sewage inlet 7A. In the present embodiment, the overall actual position of the intermediate sewage tank 7 is lower than that of the liquid outlet 1B, and the liquid at the liquid outlet 1B can naturally flow to the sewage inlet 7A through gravity. In addition, the intermediate sewage tank 7 of the present embodiment also has a wastewater inlet and a drainage outlet (not shown in the figure). The wastewater inlet is used to load new wastewater to be treated, and the drainage outlet is used to drain the drainage formed by the treatment that meets the drainage standards.

The working process of the wastewater treatment equipment 100 in the present embodiment is explained here after, in conjunction with the figures. In the present embodiment, zirconia beads with a diameter of 2.0 mm are used as the ball milling beads, and the specification of the zero-valent iron nanoparticles are: the average particle size is about 3 μm, and the specific surface area is about 0.4 $m^2/g$. In addition, the proportion of ball milling beads added is determined based on the reaction volume of reaction chamber 911, which is the actual volume of reaction chamber 911 used for ball milling treatment, that is, the volume of reaction chamber 911 minus the volume of the rotor. In the present embodiment, the amount of ball milling beads added is 2.5 kg/L based on the reaction volume.

Figure 3:
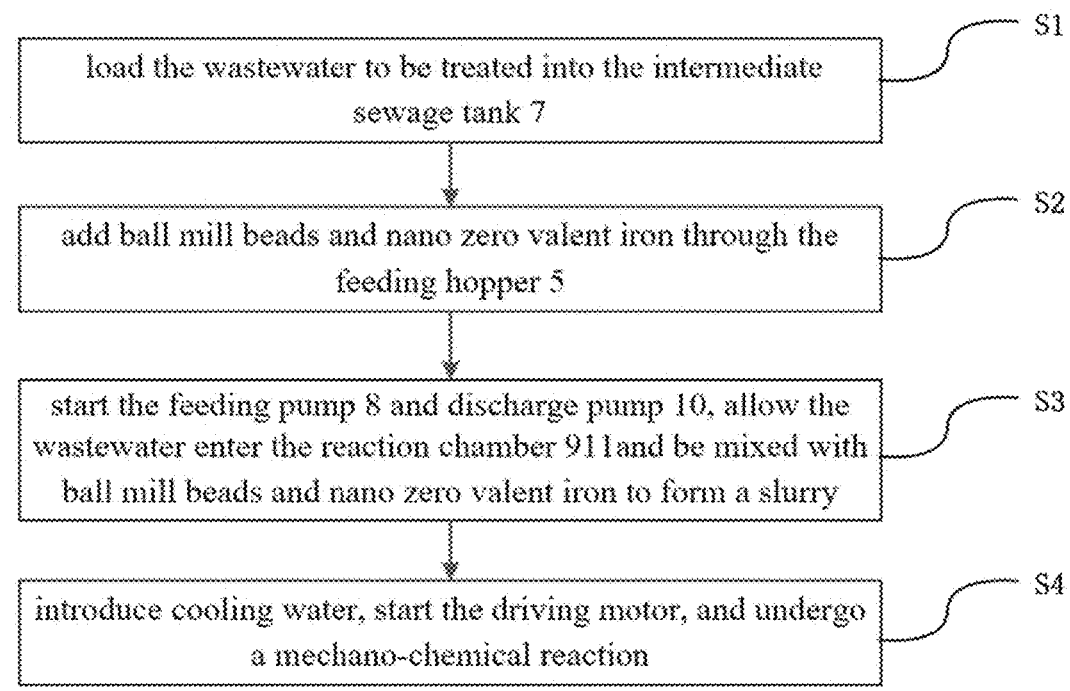
FIG. 3 is a flowchart of a wastewater treatment process of the mechano-chemical wastewater treatment equipment in the embodiment of the present invention.

FIG. 3 is a flowchart of a wastewater treatment process of the mechano-chemical wastewater treatment equipment in the embodiment of the present invention.

As shown in FIG. 3, the wastewater treatment process of the wastewater treatment equipment 100 in the present embodiment includes the following steps:

Step S1, load the wastewater to be treated into the intermediate sewage tank 7;

Step S2, open the feeding valve, add ball mill beads and zero-valent iron nanoparticles through the feeding hopper 5, and then close the feeding valve;

Step S3, start the feeding pump 8 and discharge pump 10 to allow the wastewater to be treated in the intermediate sewage tank 7 to enter the reaction chamber 911 through the sewage pipeline 6, and be mixed with ball mill beads and zero-valent iron nanoparticles to form a slurry;

Step S4, introduce cooling water into the cooling water chamber 912, start the driving motor, and set the rotate speed of the rotor 92 at 2000 rpm. At this time, under the action of the rotor 92, the slurry is vigorously stirred in the reaction chamber 911, causing the zero-valent iron nanoparticles and sewage to undergo a mechano-chemical reaction under the action of ball milling beads.

The slurry in the reaction chamber 911 enters separator 1 through the slurry pipeline 2 for separation. The separated liquid, as the sewage, flows back to the intermediate sewage tank 7 through the reflux pipeline 12 and can enter the reaction chamber 911 again through sewage pipeline 6 for mechano-chemical reaction. Meanwhile, the separated sludge enters the reaction chamber 911 again through the sludge return pipeline 3. Thus, the recycling treatment of the sewage can be achieved. When the process time is sufficient, that is, when the heavy metal in the sewage in the intermediate sewage tank 7 decreases to a drainage level, the drainage can be carried out and new wastewater to be treated can be loaded. In addition, during the process, when there is less accumulation of sludge in the separator 1, the reflux valve 11 can be closed to prevent too much separated liquid from flowing into the reaction chamber 911 through the reflux valve 11. When a certain amount of sludge accumulates, the reflux valve 11 can be opened again.

The following is a comparison between the wastewater treatment equipment 100 of the present embodiment and a traditional stirring treatment equipment to illustrate the treatment effect of the wastewater treatment equipment 100 of the present embodiment.

Wherein, the overall structure of the traditional stirring treatment equipment is basically the same as that of the wastewater treatment equipment 100 in this embodiment, except that the mechano-chemical reactor 9 is replaced with a mechanical stirring reactor. The mechanical stirring reactor includes a reaction tank and a two-blade paddle stirrer. The reaction tank has an inlet and an outlet, and the connection relationship between the two and the outside is consistent with the feeding inlet 91A and the discharge outlet 91B, respectively. The stirring blades of the two-blade paddle stirrer extend into the reaction tank to mechanically stir the slurry in the reaction tank, and the stirring speed is set at 200 rpm.

In the treatment, the difference in effectiveness between the wastewater treatment equipment 100 in the present embodiment and the traditional stirring treatment equipment is compared using Cu (II) in the wastewater as an indicator. Three batches of wastewater treatment are carried out by each type of equipment. In these three batches, the initial Cu (II) content is 30 mg/L, 300 mg/L, and 3000 mg/L, and the feeding amount of zero-valent iron nanoparticles (mZVI) is 1 g/L, 10 g/L, and 20 g/L, respectively.

Figure 4:
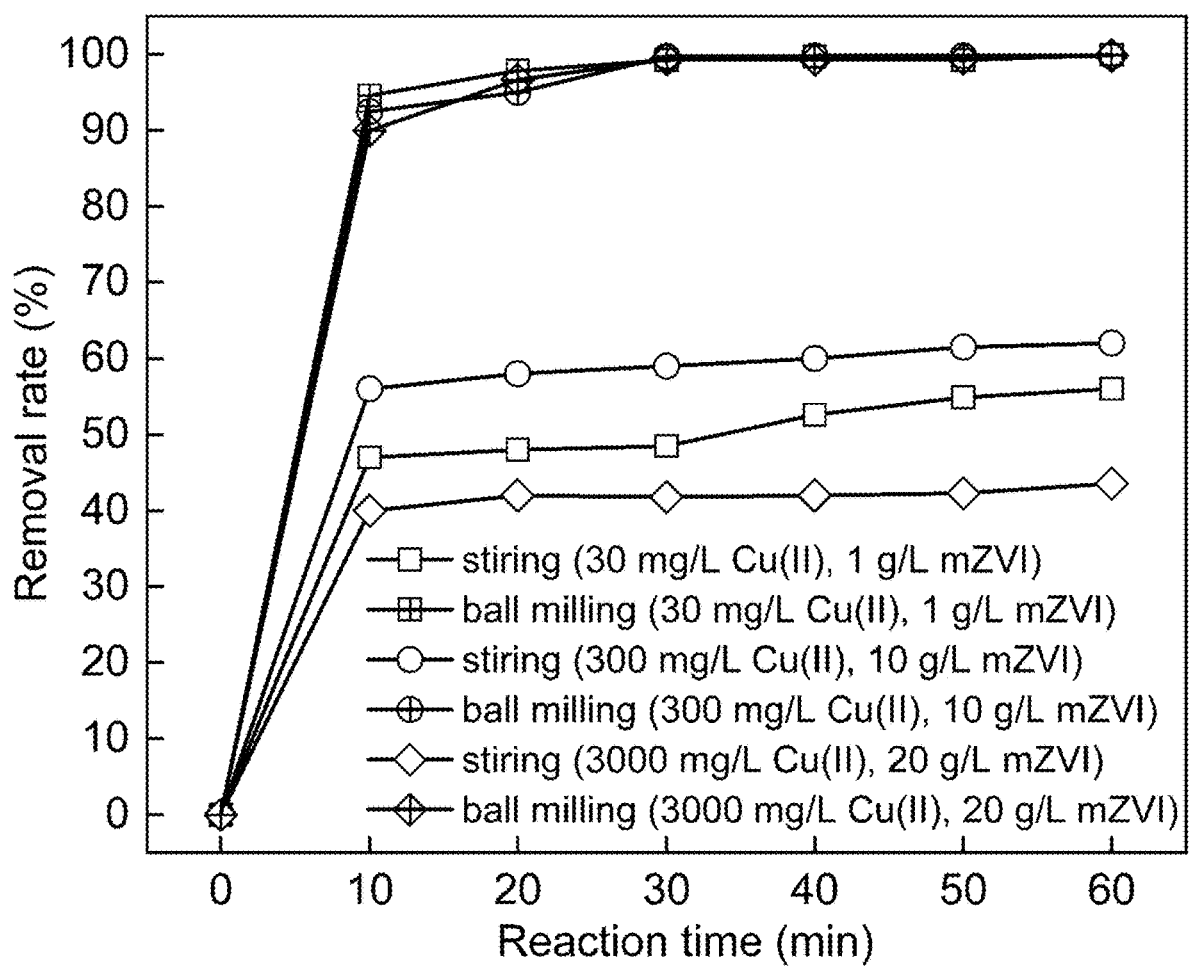
FIG. 4 is a comparison of the wastewater treatment effects of the wastewater treatment equipment in the embodiment of the present invention.

FIG. 4 is a comparison of the wastewater treatment effect of the wastewater treatment equipment in the embodiment of the present invention.

As shown in FIG. 4, among the three batches of wastewater treatment, the wastewater treatment equipment 100 in the present embodiment achieved a Cu (II) removal rate of about 90% after about 10 minutes of treatment, and the removal rate approached 100% after 60 minutes. Compared to this, the Cu (II) removal rate of the stirring treatment equipment is only about 50% after about 10 minutes, and the removal rate even after 60 minutes of reaction does not exceed 60%.

Function and Effect of the Embodiment

The data result of the above comparison of wastewater treatment effect indicates that: compared to traditional mechanical treatment methods, due to the use of a mechanochemical reactor 9, the wastewater treatment equipment 100 in the present embodiment can significantly improve the treatment effect of heavy metals in wastewater, accelerate treatment speed, and improve the final removal rate. The reason for the high process efficiency of mechano-chemical reactor 9 is that it is equivalent to a ball milling equipment, through which a high-energy ball milling treatment can be achieved, ensuring sufficient mixing and close contact of reactants, and since the reaction chamber 911 forms high pressure, the contact area between reaction particles is increased, promoting the diffusion of the entire interface. Thereby the reaction is significantly accelerated. On the other hand, ball milling can activate the solid, that is, activate zero valent iron. When mechanical force is applied to zero valent iron through ball milling treatment, the strain field will be specifically reflected by the displacement of atoms from the equilibrium position on the lattice node, changes in bond length and angle, and in some cases, excitation of the electronic system, significantly improving the reaction activity of zero valent iron and achieving high-energy degradation of pollutants.

In addition, in the embodiment, due to the use of the intermediate sewage tank 7 to accommodate sewage, the use of the separator 1 to separate the solid and liquid in the slurry, and the reflux of the liquid as sewage to the intermediate sewage tank 7, and the return of the sludge to the reaction chamber of the mechano-chemical reactor 9, solid-liquid separation can be effectively achieved and sewage recycling treatment can be achieved. Wherein, since the overall position of the mechano-chemical reactor 9 is lower than the sludge outlet 1C and the position of the intermediate sewage tank 7 is lower than the liquid outlet 1B, the separated sludge and sewage can naturally reflux through gravity, which can save energy.

The above embodiment is only used to illustrate the present invention, and the wastewater treatment equipment 100 of the present invention is not limited to the scope described in the above embodiment.

For example, in the above embodiment, the number of mechano-chemical reactors 9 is one. However, in order to increase the processing capacity in the present invention, multiple mechano-chemical reactors 9 can also be set, with the feeding inlets 91A of each mechano-chemical reactor parallelly connected and the discharge outlets 91B of the mechano-chemical reactor parallelly connected.

In addition, the overall position of the intermediate sewage tank 7 in the embodiment is lower, and the position of the sewage inlet 7A is lower than the liquid outlet 1B, so the liquid separated by the separator 1 can naturally flow into the intermediate sewage tank 7 through gravity. As an alternative solution, in other embodiments, this high and low position setting can also be omitted, and a reflux pump can be set on the reflux pipeline 12 to drive the liquid to flow towards the intermediate sewage tank 7.

What is claimed is:

1. A mechano-chemical wastewater treatment equipment to treat wastewater containing heavy metals to form a drainage, comprising:
    an intermediate sewage tank to store the wastewater to be treated and sewage formed during a treatment process, the intermediate sewage tank comprising a sewage inlet and a sewage outlet;
    at least one mechano-chemical reactor, wherein the at least one mechano-chemical reactor comprises a ball milling device and is configured to receive wastewater containing heavy metals, balls for a ball milling treatment, and zero-valent iron nanoparticles, wherein said at least one mechano-chemical reactor is configured to carry out a mechano-chemical reaction between the wastewater and zero-valent iron nanoparticles through the ball milling treatment, said at least one mechano-chemical reactor comprises:
        a reactor shell with a reaction chamber internally formed, the reactor shell comprising a feeding inlet to allow a slurry to enter said reaction chamber and a discharge outlet to allow said slurry to flow out of said reaction chamber;
        a rotor, which is set inside said reaction chamber; and
        a driving mechanism to drive a rotation of said rotor; and
    a separator, utilized for solid-liquid separation of said slurry produced by said at least one mechano-chemical reactor, the separator comprising a slurry inlet for said slurry to enter from said discharge outlet, a liquid outlet for separated liquid to flow out, and a sludge outlet for a separated sludge to flow out; and
    wherein said sewage outlet is connected to said feeding inlet, said liquid outlet is connected to said sewage inlet, said sludge outlet is connected to said feeding inlet, and said slurry inlet is connected to said discharge outlet.

2. The mechano-chemical wastewater treatment equipment according to claim 1, further comprising a feeding hopper to feed the zero-valent iron nanoparticles and ball milling beads to said feeding inlet connected to said feeding hopper.

3. The mechanical chemical wastewater treatment equipment according to claim 1, further comprising a cooling water chamber set at a periphery of said reaction chamber, the cooling chamber is formed around said reaction chamber without being connected to said reaction chamber and the cooling chamber accommodates cooling waters to cool said reaction chamber.

4. The mechanical chemical wastewater treatment equipment according to claim 1, further comprising multiple inclined plates set at an internal bottom of said separator.

5. The mechano-chemical wastewater treatment equipment according to claim 1, wherein a surface of said rotor is covered with a layer of polyurethane material.

6. The mechanical chemical wastewater treatment equipment according to claim 1, wherein an overall position of said mechano-chemical reactor is lower than said sludge outlet.

7. The mechanical chemical wastewater treatment equipment according to claim 1, wherein an overall position of said intermediate sewage tank is lower than said liquid outlet.

8. The mechano-chemical wastewater treatment equipment according to claim 1, wherein:
    said sewage outlet is connected to said feeding inlet through a sewage pipeline, and a feed pump is set on said sewage pipeline to pump said sewage from said sewage outlet to said feeding inlet; and
    said slurry inlet is connected to said discharge outlet through a slurry pipeline, and a discharge pump is set on said slurry pipeline to pump said slurry from said discharge outlet to said slurry inlet.

9. The mechanical chemical wastewater treatment equipment according to claim 1, wherein the at least one mechano-chemical reactor comprises a multiple number of said mechano-chemical reactors, said feeding inlets of said mechano-chemical reactors are connected to each other and said discharge outlets of said mechano-chemical reactors are connected to each other.

* * * * *